`US008353383B2`

(12) United States Patent
Carson

(10) Patent No.: US 8,353,383 B2
(45) Date of Patent: Jan. 15, 2013

(54) WATER MOTION POWERED SEISMIC ENERGY SOURCE AND METHOD FOR SEISMIC SURVEYING THEREWITH

(75) Inventor: Richard G Carson, Peebles (GB)

(73) Assignee: PGS Geophysical AS, Lysaker (NO)

( * ) Notice: Subject to any disclaimer, the term of this patent is extended or adjusted under 35 U.S.C. 154(b) by 31 days.

(21) Appl. No.: 13/160,340

(22) Filed: Jun. 14, 2011

(65) Prior Publication Data
US 2012/0318604 A1    Dec. 20, 2012

(51) Int. Cl.
*G01V 1/00* (2006.01)
(52) U.S. Cl. ........ 181/110; 181/106; 181/111; 181/119; 181/120; 181/108; 367/141; 367/146; 367/143
(58) Field of Classification Search ................ 181/108, 181/106, 111, 119, 120, 110; 367/141, 146, 367/143
See application file for complete search history.

(56) References Cited

U.S. PATENT DOCUMENTS

| | | | | |
|---|---|---|---|---|
| 3,536,157 A | * | 10/1970 | Anstey | 181/120 |
| 4,323,991 A | * | 4/1982 | Holmes et al. | 367/83 |
| 4,970,704 A | * | 11/1990 | Kelly | 367/142 |
| 5,229,554 A | * | 7/1993 | Cole | 181/106 |
| 5,420,829 A | * | 5/1995 | Pascouet | 367/144 |
| 6,286,612 B1 | * | 9/2001 | Pascouet | 175/1 |
| 7,028,807 B2 | * | 4/2006 | Raleigh et al. | 181/119 |
| 7,551,518 B1 | | 6/2009 | Tenghamn | |
| 8,102,731 B2 | * | 1/2012 | Cambois | 367/15 |
| 2010/0212927 A1 | * | 8/2010 | Harrick | 174/110 R |
| 2011/0038225 A1 | * | 2/2011 | Tenghamn | 367/21 |
| 2011/0170375 A1 | | 7/2011 | Thompson et al. | |
| 2012/0087207 A1 | * | 4/2012 | Kostov et al. | 367/20 |

OTHER PUBLICATIONS

Computational Studies of Resonance Wave Pumping in Compliant Tubes, J. Fluid Mech., 2008, vol. 608, United kingdom.
A. P. Moser, S. Folkman, Design of Pressure Pipes, Buried Pipe Design, McGraw-Hili Inc., Jul. 30, 2008.

* cited by examiner

*Primary Examiner* — Forrest M Phillips

(57) ABSTRACT

A seismic energy source includes an inlet aperture and an inlet pipe in fluid communication with an outlet of the inlet aperture at an inlet end of the inlet pipe. The inlet pipe is in fluid communication with an accumulator at an outlet end of the inlet pipe. An outlet pipe is in fluid communication with the accumulator at an inlet end of the outlet pipe and is connected to an outlet valve at an outlet end of the outlet pipe. The outlet valve is actuated by fluid pressure in the outlet pipe. An actuation pressure of the valve, and diameter, length and material properties of the outlet pipe are selected to cause a reflected water pressure wave resulting from closure of the valve to travel within the outlet pipe at a selected velocity. Motion of the seismic source through the water provides water pressure to operate the source.

19 Claims, 2 Drawing Sheets

WATER MOTION POWERED SEISMIC ENERGY SOURCE AND METHOD FOR SEISMIC SURVEYING THEREWITH

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine seismic surveying. More particularly, the invention relates to seismic energy sources used in such surveying.

Marine seismic surveying may be used to infer structure and composition of formations below the bottom of a body of water such as a lake or ocean. Marine seismic surveying typically includes towing a seismic energy source using a survey vessel or another vessel, or an array of such sources, in the body of water, and actuating the source at selected times. One or more seismic streamer cables may be towed by the survey vessel or by another vessel. The seismic streamer cables include seismic sensors at spaced apart locations, which detect seismic energy that may be reflected from acoustic impedance boundaries in the formations below the water bottom. Cables having seismic sensors may also be deployed on the water bottom.

Seismic energy sources known in the art for marine seismic surveying include air guns and water guns. Such seismic energy sources may include pressure chambers to hold compressed gas, air or water. The compressed gas, air or water may be released by selective operation of a control valve such that rapid discharge of the compressed gas, air or water creates a pulse of seismic energy in the body of water.

Other seismic energy sources known in the art include marine vibrators. An example of a marine vibrator is described in U.S. Pat. No. 7,551,518 issued to Tenghamn, which is incorporated herein by reference.

A need has been identified for marine seismic energy sources that can generate substantial energy, at frequencies less than about 10 Hz. 10 Hz is believed to be the practical lower frequency limit of air guns, water guns and marine vibrators known in the art. One of the limiting factors for air guns and water guns with respect to a lowest practical output frequency is the size of the chamber used to store the pressurized gas, air or water. One of the limiting factors of a seismic energy source such as a marine vibrator is the power required to move the driving element at low frequencies and to maintain a reasonably pure tone, because hydraulically driven devices in the vibrator may have difficulty shifting the required fluid volume for such low frequencies. Thus, the need for a seismic energy source having output in such frequency range has yet to be adequately addressed.

DETAILED DESCRIPTION

Figure 1:
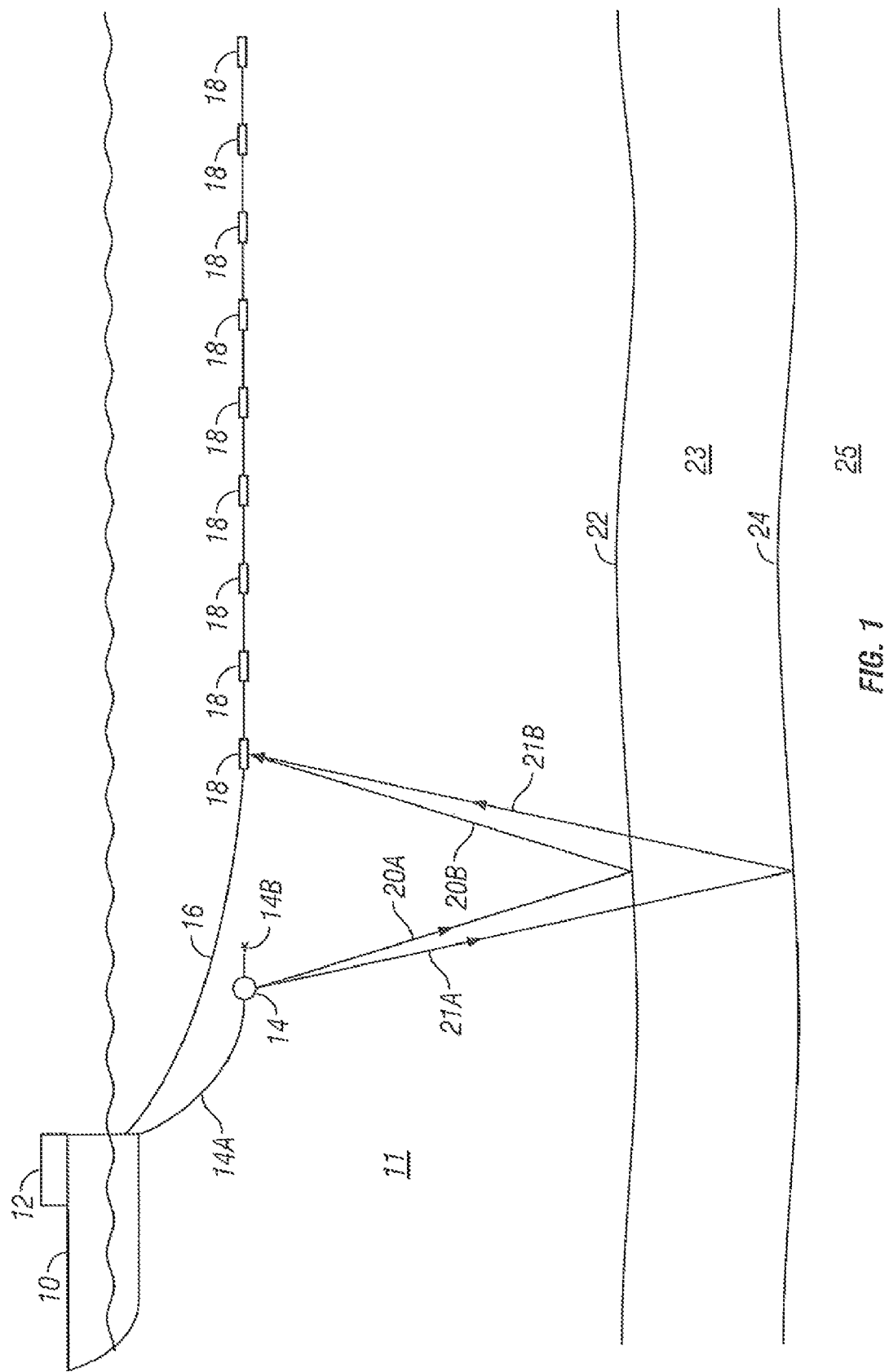
FIG. 1 shows an example embodiment of a marine seismic survey system that may use a seismic energy source according to the invention.

An example embodiment of a marine seismic survey system is shown schematically in FIG. 1. The system may include a seismic survey vessel 10 that moves along the surface of a body of water 11 such as a lake or the ocean. The seismic survey vessel 10 may include thereon equipment shown generally at 12, referred to for convenience as a "recording system," and that includes devices (none shown separately) for, among other functions, determining geodetic position of the seismic survey vessel 10, for controlling actuation of one or more seismic energy sources 14 (explained further below), and for detecting and making a time indexed record of signals detected by seismic sensors 18 disposed at spaced apart locations along one or more seismic sensor streamers 16. The recording system 12 may include a general purpose, programmable computer (not shown separately) for recording and processing signals detected by the seismic sensors 18.

The seismic sensor streamer 16 may be towed by the seismic survey vessel 10 or by another vessel (not shown). Only one seismic sensor streamer 16 is shown in FIG. 1 for clarity of the illustration. It will be appreciated by those skilled in the art that a plurality of such seismic sensor streamers typically will be towed by the seismic survey vessel 10, or by another vessel (not shown), using certain towing equipment (not shown) known in the art to maintain the seismic sensor streamers in selected lateral positions with respect to each other and with respect to the center line of the towing vessel, e.g., the seismic survey vessel 10.

While only one seismic energy source 14 is shown in FIG. 1 for clarity of the illustration, more than one such seismic energy source according to various aspects of the invention may be used in other embodiments. The one or more seismic energy sources 14 may be towed by the seismic survey vessel 10 or by another vessel (not shown) using an umbilical cable 14A. The one or more seismic energy sources 14 may actuate from time to time, and energy therefrom may travel through the water 11 generally downwardly, as shown at 20A and 21A, reaching the water bottom 22 and one or more acoustic impedance boundaries 24 in the formations 23, 25 below the water bottom 22. Reflected seismic energy may travel generally upwardly, shown at 20B and 21B, and may be detected by seismic sensors 18 in the streamer 16. The recording system 12 may make recordings of the detected seismic signals generally indexed with respect to the actuation time of the one or more seismic energy sources 14.

Figure 2:
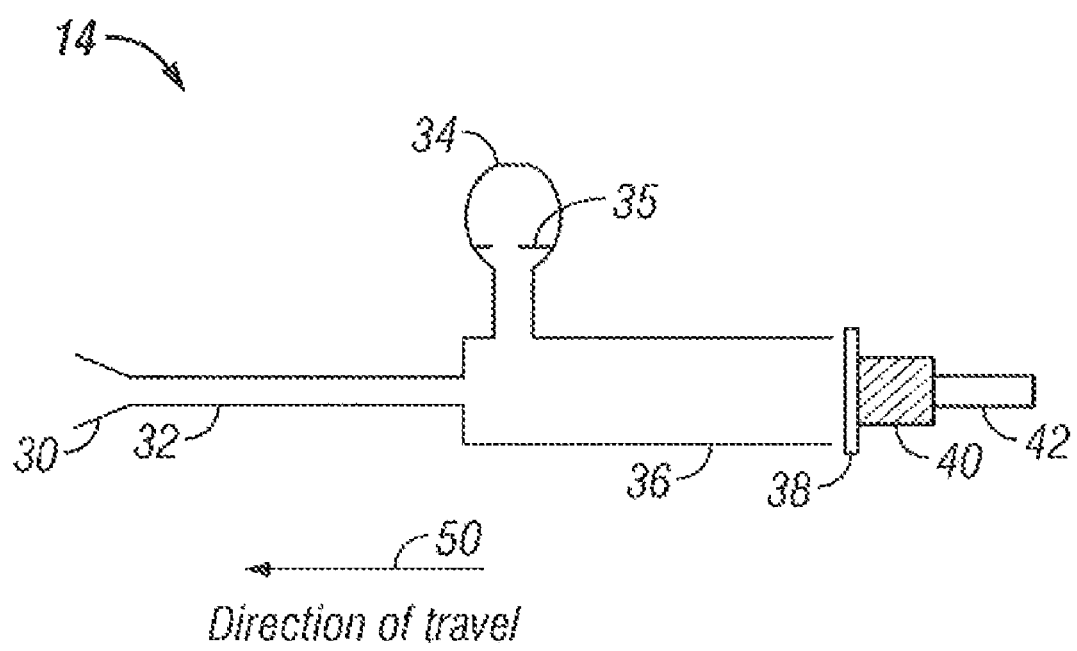
FIG. 2 shows a schematic diagram of an example embodiment of a seismic energy source according to the invention.

An example embodiment of a seismic energy source according to the invention is shown schematically in FIG. 2. The seismic energy source 14 may be located in the water 11. For example, the seismic energy source 14 may be suspended from one or more floats (not shown) and may towed behind the seismic survey vessel (10 in FIG. 1) as shown in FIG. 1 or by another vessel (not shown). For convenience hereinafter, the vessel towing the seismic energy source will be referred to as the "towing vessel." The seismic energy source 14 may be towed with an inlet aperture 30 facing the direction of travel 50 of the towing vessel. In some embodiments the inlet aperture may be a funnel. Active parts of the seismic energy source 14 may include the inlet aperture 30 and may further comprise an inlet pipe 32 coupled to or in fluid communication with the outlet of the inlet aperture 30, and an accumulator 34 coupled to or in fluid communication with an outlet of the inlet pipe 32. The accumulator 34 may be a pressure containment device such as a sphere or a cylinder having its internal volume separated by a volume separator 35. The volume separator 35 may be, for example, a flexible diaphragm or a piston. One side of the volume separator 35 may be biased, for example, by including pressurized gas in the separated volume or by using a biasing device such as a spring. Thus, the accumulator 34 will have a biased pressure that will increase as pressure on the other side of the volume separator 35 increases, and vice versa. Such other side of the volume separator 35 may be coupled to or be in fluid communication with the outlet end of the inlet pipe 32.

The seismic energy source 14 may include an outlet pipe 36 having one end thereof in fluid communication with the separated volume in the accumulator 34 opposed to the biased side of the volume separator 35. An outlet valve 38 may be disposed at the other end of the outlet pipe 36. The outlet valve 38 may be set to open at a selected fluid pressure (the "actuation pressure"). The actuation pressure of the outlet valve 38 may be selected such that the seismic energy source 14 will operate at a selected frequency. The opening pressure of the outlet valve 38 may be selected by operation of a biasing device 40 such as a spring. An amount of force provided by the biasing device 40 may be changed or selected by a force control 42 coupled to the biasing device 40, for example and without limitation, an hydraulic cylinder and piston combination, or a worm gear, motor and ball nut combination. Signals and/or power to operate the force control 42 may be communicated from the towing vessel (e.g., seismic survey vessel 10 in FIG. 1) along the umbilical cable 14A.

During operation of the seismic energy source 14, as it is towed through the body of water (11 in FIG. 1), water is conducted though the inlet aperture 30 and through the inlet pipe 32. In some embodiments, the seismic energy source 14 may be towed through the body of water 11 at approximately the same speed as that of the towing vessel through the body of water 11. Initially the outlet valve 38 may be closed, so that water pressure may build in the outlet pipe 36 and the accumulator 34. A diameter of the inlet pipe 32 may be relatively small compared to the diameter of the outlet pipe 36 to reduce backflow of water from the accumulator 34 if the pressure in the inlet pipe 32 drops momentarily. When the water pressure in the accumulator 34 and the outlet pipe 36 exceed the selected actuation pressure of the outlet valve 38, the outlet valve 38 may open, allowing water to rapidly discharge from the outlet pipe 36. Once the water pressure drops below the actuation pressure of the outlet valve 38, the outlet valve 38 may close rapidly. Rapid closure of the outlet valve 38 may result in a pressure wave being generated as a result of inertia of the moving water toward the outlet valve 38. Such pressure wave may reflect from the closed outlet valve 38 toward the accumulator end of the outlet pipe 36. The reflected pressure wave may partially recharge the accumulator 34 so that its bias pressure increases, thus storing some of the energy in the reflected pressure wave. The increased accumulator 34 pressure may subsequently discharge into the water in the outlet pipe 36, such that the actuation pressure of the outlet valve 38 may once again be exceeded, causing the outlet valve 38 to open. The foregoing actuation and closing of the outlet valve 38, reflection of a pressure wave caused by closing the outlet valve, recharge of the accumulator 34, discharge of the accumulator 34 and reopening of the outlet valve 38 may continue for several cycles.

The principle by which the seismic energy source 14 of the present invention is believed to work is so-called "water hammer", because the opening and closing of the outlet valve 38 may create transient surges in the pressure of the water in the outlet pipe 36. Transient surges in pressure may occur over a relatively short time and between one steady state and another. A transient surge may occur, and the system ("system" in the present case including the accumulator 34, outlet pipe 36 and outlet valve 38) then may then return to the same steady state as before the transient surge. In many instances, transient surges may not be cyclic in nature, although they may be repetitive. Any action in a water piping system that results in a change in velocity of the water in the system may be a potential cause of a water hammer transient surge. It is currently believed that the magnitude of water hammer pressures generated by a given change in velocity depends on (1) the geometry of the system, (2) the magnitude of the change in velocity, and (3) the speed of the water hammer wave for the particular system.

These variables may be expressed quantitatively by the expression:

$$\Delta H = \frac{a}{g} \Delta V \tag{1}$$

where ΔH represents the surge pressure, a represents the velocity of the pressure wave, g represents acceleration due to gravity and ΔV represents change in velocity of the water. The pressure wave velocity, a, depends on the mechanical properties of the outlet pipe 36, including its modulus of elasticity, diameter, and thickness. The pressure wave velocity, a, will also be related to the water properties, including its modulus of elasticity and density. The foregoing properties of the outlet pipe 36 and the water therein may be used to calculate the pressure wave velocity using the expression:

$$a = \frac{12\sqrt{K/\rho}}{\sqrt{1 + (K/E)(D/t)C1}} \tag{2}$$

wherein K represents the bulk modulus of the water, ρ represents the density of the water, D represents the internal diameter of the outlet pipe 36, t represents the wall thickness of the outlet pipe 36 and E represents the modulus of elasticity of the outlet pipe 36 material. C1 is a constant dependent upon pipe constraints (e.g., C1=1.0 for a pipe with expansion joints along its length).

By selecting the accumulator 34 volume and the outlet pipe 36 diameter, length and material properties (e.g., modulus of elasticity), the velocity of the reflected pressure wave may be selected, as well as its travel time from the outlet valve 38 back to the accumulator 34. The reflected pressure wave travel time may be related to the seismic energy output frequency of the seismic energy source 14.

Referring back to FIG. 1, because the energy output of the seismic energy source 14 may be related to pressures within the various components thereof and its actuation time is not controlled, and because the seismic energy output from the seismic energy source 4 may be oscillatory in nature, it is desirable to have a recording of the output of the seismic energy source 14 to estimate the impulse response of the formations 23, 25 to the energy imparted thereto by the seismic energy source 14. A near field sensor 14B may be positioned proximate the seismic energy source 14 to detect output of the seismic energy source 14 before substantial interaction with the water 11 has taken place. Output of the near field sensor 14B may be conducted to the recording system 12 for recording and processing with the recorded signals from the seismic sensors 18.

In some example embodiments, a plurality of seismic energy sources configured as explained with reference to FIG. 2, each having the same or a different reflected wave travel time (and therefore different seismic energy output frequency), may be towed by the seismic survey vessel 10 and/or another vessel (not shown). Each such seismic energy source may include an associated near field sensor 14B as explained above. Having a plurality of such seismic energy sources with different reflected wave travel times may provide seismic energy at a plurality of selected frequencies.

A seismic energy source and arrays of such sources may provide seismic energy at lower frequencies than may be practical using seismic energy sources known in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic energy source, comprising: an inlet aperture; an inlet pipe in fluid communication with an outlet of the inlet aperture at an inlet
    end of the inlet pipe and in fluid communication with an accumulator, in which fluid is collected and kept under pressure, at an outlet end of the inlet pipe;
    an outlet pipe in fluid communication with the accumulator at an inlet end of the outlet pipe and connected to an outlet valve at an outlet end of the outlet pipe, the outlet valve actuated by fluid pressure in the outlet pipe, wherein an actuation pressure of the outlet valve, and a diameter, length and material properties of the outlet pipe are selected to cause a reflected water pressure wave resulting from closure of the outlet valve to travel within the outlet pipe at a selected velocity.

2. The seismic energy source of claim 1 further comprising a force controller coupled to the outlet valve, the force controller operable to enable selection of an actuation pressure of the outlet valve.

3. The seismic energy source of claim 1 wherein the accumulator comprises a volume separator, the volume separator having a first and a second side, and the accumulator has a selected bias pressure on the first side of the volume separator.

4. The seismic energy source of claim 3 wherein the second side of the volume separator is in fluid communication with the outlet end of the inlet pipe and the inlet end of the outlet pipe.

5. The seismic energy source of claim 1 wherein a diameter of the inlet pipe is smaller than a diameter of the outlet pipe.

6. The seismic energy source of claim 1 wherein the seismic energy source is configured to be towed by a vessel in a body of water, and wherein an inlet of the inlet aperture is oriented in a direction of motion of the vessel in the body of water.

7. The seismic energy source of claim 1 further comprising a near field sensor disposed proximate the outlet valve.

8. The seismic energy source of claim 1 wherein the inlet aperture comprises a funnel.

9. A method for marine seismic surveying, comprising:
    towing a seismic energy source in a body of water, the seismic energy source comprising:
    an inlet aperture,
    an inlet pipe in fluid communication with an outlet of the inlet aperture at an inlet end of the inlet pipe and in fluid communication with an accumulator, in which fluid is collected and kept under pressure, at an outlet end of the inlet pipe,
    an outlet pipe in fluid communication with the accumulator at an inlet end of the outlet pipe end and connected to an outlet valve at outlet end of the outlet pipe, the outlet valve actuated by fluid pressure in the outlet pipe, wherein an actuation pressure of the outlet valve, and a diameter, length and material properties of the outlet pipe are selected to cause a reflected water pressure wave resulting from closure of the outlet valve to travel within the outlet pipe at a selected velocity;
    whereby motion of the seismic energy source through the water imparted by towing provides water pressure to operate the seismic energy source.

10. The method of claim 9 further comprising detecting seismic energy using at least one seismic sensor, the seismic energy resulting from actuation of the seismic energy source.

11. The method of claim 10 further comprising detecting seismic energy with a seismic sensor disposed proximate the seismic energy source.

12. The method of claim 11 further comprising making a recording of signals detected by the at least one seismic sensor and the seismic sensor disposed proximate the seismic energy source.

13. The method of claim 10 wherein the at least one seismic sensor is disposed in a cable towed by a seismic survey vessel.

14. The method of claim 9 wherein the outlet valve is configured to open at a preselected water pressure.

15. The method of claim 9 further comprising towing a plurality of seismic energy sources in the body of water, each of the plurality of seismic energy sources comprising:
    an inlet aperture,
    an inlet pipe in fluid communication with an outlet of the inlet aperture at an inlet end of the inlet pipe end and in fluid communication with an accumulator, in which fluid is collected and kept under pressure, at an outlet end of the inlet pipe,
    an outlet pipe in fluid communication with the accumulator at an inlet end of the outlet pipe and connected to an outlet valve at an outlet end of the outlet pipe end, the outlet valve actuated by fluid pressure in the outlet pipe, wherein an actuation pressure of the outlet valve, and a diameter, length and material properties of the outlet pipe of each of the seismic energy sources are selected to cause a reflected water pressure wave resulting from closure of the outlet valve to travel within the outlet pipe at an associated selected velocity.

16. The method of claim 15, wherein the selected velocity associated with at least one of the plurality of seismic energy sources differs from the other associated selected velocities.

17. The method of claim 15 wherein the inlet aperture on at least one of the seismic energy sources comprises a funnel.

18. The method of claim 9 wherein the inlet aperture comprises a funnel.

19. The method of claim 9 wherein the seismic energy source further comprises a force controller coupled to the outlet valve, and the method further comprises operating the force controller to select the actuation pressure of the outlet valve.

* * * * *